(No Model.)

J. M. McHENRY.
VEHICLE SEAT.

No. 517,526. Patented Apr. 3, 1894.

WITNESSES

INVENTOR
John M. McHenry.
by Herbert W. Jenner.
Attorney

THE NATIONAL LITHOGRAPHING COMPANY,
WASHINGTON, D. C.

United States Patent Office.

JOHN M. McHENRY, OF LINCOLNVILLE, KANSAS.

VEHICLE-SEAT.

SPECIFICATION forming part of Letters Patent No. 517,526, dated April 3, 1894.

Application filed December 30, 1893. Serial No. 495,210. (No model.)

*To all whom it may concern:*

Be it known that I, JOHN M. MCHENRY, a citizen of the United States, residing at Lincolnville, in the county of Marion and State of Kansas, have invented certain new and useful Improvements in Vehicle-Seats; and I do hereby declare the following to be a full, clear, and exact description of the invention, such as will enable others skilled in the art to which it appertains to make and use the same.

This invention relates to vehicle seats; and it consists in the novel construction and combination of the parts hereinafter fully described and claimed.

Figure 1:
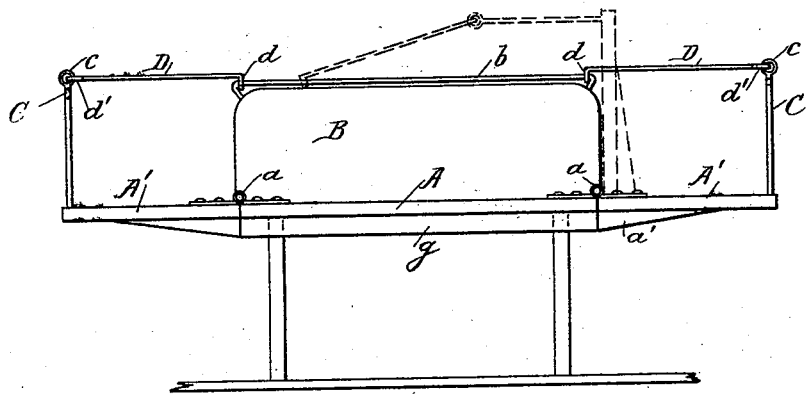
Figure 2:
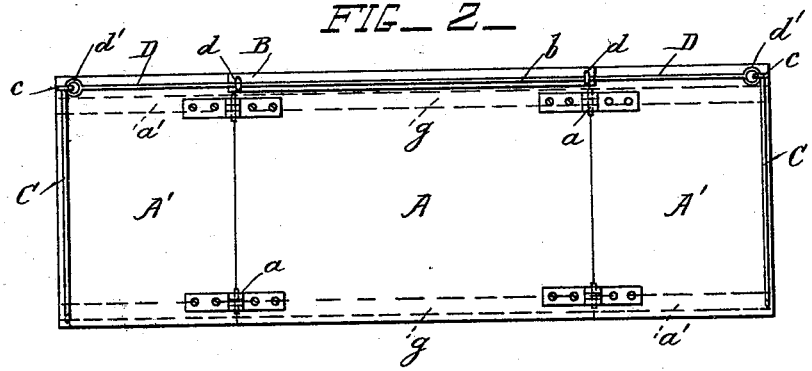

In the drawings: Figure 1 is a front view of the seat; and Fig. 2 is a plan view of the same.

The seat consists of a stationary central portion A, adapted to be rigidly secured to the vehicle, and two movable portions A'. The movable portions A' are arranged one on each side of the central portion A, and are hinged to it by any approved construction of hinges $a$ in such a manner that they can be turned upward to a vertical position, as indicated by the dotted lines in Fig. 1. The central portion A has bars $g$ secured on its under side, and the end portions A' have blocks $a'$ which abut against the ends of the bars $g$ when the portions A' are horizontal.

B is a vertical back secured to the central portion A of the seat, and $b$ is a guide bar secured to the top of the back.

C are side rails secured to the ends of the movable portions A' of the seat. Each rail C is provided with an eye $c$ at the rear, in line with the guide rod $b$.

D are rods provided with eyes $d$ and $d'$. The eyes $d$ slide upon the guide rod $b$, and the eyes $d'$ are pivoted to the eyes $c$. When the end portions A' are lowered, the eyes $d$ come against the end portions of the guide rod $b$, and the rods D form backs for the end portions of the seat. The side rails form convenient handles for raising the end portions to their vertical positions. When the end portions are lowered a long seat is formed, and the object in making the end portions movable is to enable persons to get into or out of the seat in the vehicle with greater convenience, and without having to move the whole seat, or to clamber over the back of it.

What I claim is—

1. In a vehicle seat, the combination, with a stationary portion, of a movable portion hinged thereto, and a rod pivoted to the movable portion and slidably connected to the back of the stationary portion of the seat, said rod forming a back for the said movable portion, substantially as set forth.

2. In a vehicle seat, the combination, with a stationary central portion provided with a back, and a guide rod secured to the back; of two end portions hinged to the said central portion, and rods provided with eyes sliding on the said guide rod and pivotally connected with the end portions, said rods forming backs for the end portions and supporting them when lowered, substantially as set forth.

3. The combination, with the central portion provided with a back, and with bars under it, and the guide rod secured to the top of the back; of the end portions hinged to the said central portion and provided with blocks abutting against the ends of the bars, the side rails provided with eyes, and the rods pivoted to the said eyes and slidably connected with the said guide rod, substantially as set forth.

In testimony whereof I affix my signature in presence of two witnesses.

JOHN M. McHENRY.

Witnesses:
MINNIE O. McHENRY,
J. W. McHENRY.